United States Patent [19]

Nakano et al.

[11] Patent Number: 4,587,592

[45] Date of Patent: May 6, 1986

[54] ZINC OXIDE LIGHTNING PROTECTOR

[75] Inventors: Kouichi Nakano, Ibaraki; Seiichi Maruyama, Hitachi; Seizo Nakano, Mito; Masatomo Sato, Hitachi, all of Japan

[73] Assignee: Hitachi, Ltd., Tokyo, Japan

[21] Appl. No.: 653,548

[22] Filed: Sep. 24, 1984

[30] Foreign Application Priority Data

Sep. 26, 1983 [JP] Japan ................................ 58-178971

[51] Int. Cl.⁴ ................................................ H02H 3/22

[52] U.S. Cl. ........................................ 361/127; 338/21

[58] Field of Search ............... 361/117, 126, 127, 128, 361/129, 130; 338/21, 57

[56] References Cited

U.S. PATENT DOCUMENTS

| | | | |
|---|---|---|---|
| 4,262,318 | 4/1981 | Shirakawa et al. | 338/21 X |
| 4,262,319 | 4/1981 | Perry et al. | 338/21 X |

FOREIGN PATENT DOCUMENTS

| | | | |
|---|---|---|---|
| 25986 | 9/1964 | Japan . | |
| 35426 | 11/1964 | Japan . | |
| 35427 | 11/1964 | Japan . | |
| 72151 | 6/1978 | Japan | 361/127 |
| 154064 | 12/1979 | Japan | 361/127 |

*Primary Examiner*—Harry E. Moose, Jr.
*Attorney, Agent, or Firm*—Antonelli, Terry & Wands

[57] ABSTRACT

A zinc oxide lightning protector, wherein end plates are mounted at the ends of an insulator and a zinc oxide element section is arranged between the cover plates. Support metal members are mounted on the cover plates between the zinc oxide element section and the insulator to support an insulation cylinder therebetween. A space is formed between at least an end of an insulation cylinder and a corresponding cover plate to absorb the expansion or contraction of the insulation cylinder due to temperature changes, thus preventing the insulation cylinder from deforming. The elements are eccentrically arranged against the insulation cylinder, to thereby cause the gas flow along peripheral direction so that the laminar flow is changed into a turbulent flow. Thus, the heat conduction is improved to improve the radiation characteristic of the zinc oxide element section.

5 Claims, 6 Drawing Figures

ZINC OXIDE LIGHTNING PROTECTOR

The present invention relates to a zinc oxide lightning protector with an improved arrangement of an insulation cylinder interposed between a zinc oxide element section and an insulator.

In, for example, Japanese utility model publication No. 25986/64, a a lightning protector, such as is proposed wherein a zinc oxide element section is disposed in a porcelain insulator, with the zinc oxide element section including a plurality of layer of zinc oxide element forming a nonlinear resistor. Cover plates are mounted on the ends of the insulator and the zinc oxide element section to seal the insulator, with an elastic spring being interposed between one of the cover plates and the zinc oxide element section. The elastic spring functions to hold the plurality of layers of zinc oxide elements by pressure.

Upon the occurrence of an abnormal voltage such as, for example, a surge-like over-voltage due to a lightning discharge, an over-voltage due to a switching surge, or AC over-voltage due to Ferranti phenomena, the proposed lightning protector acts in such a manner that the over-voltage is discharged from one cover plate through the zinc oxide element section, through the other cover plate to ground to reduce the peak value, thereby protecting the line and associated power devices. In the process, if an over-voltage exceeding the energy capacity of the lightning protector is exceeded, a crack develops in the zinc oxide element section of the insulator. Application of an AC power under this condition would damage the zinc oxide element section, and an arc would crawl along the interior surface of the insulator make the same fragile against the arc heat. The resulting chips of the zinc oxide element, by collision with the insulator, would disperse broken parts of insulator and the zinc oxide element, thus damaging external power equipments.

In, for example, Japanese utility model publication No. 35426/64 and utility model publication No. 35427/64, a lightning protector is proposed which comprises a metal end cover on the outside of the cover plates, a pressure-averting film in a through hole formed in a part of the cover plate, and an insulation cylinder is positioned between the zinc oxide element section and the insulator.

In this lightning protector, the dispersion of the zinc oxide element is prevented by the insulation cylinder. The hot gas, generated by an arc, which is discharged externally through a discharge port in the metal end cover by breaking the pressure-averting film, is offset by upper and lower end plates at the pressure-discharge port. As a result, the damage of the insulator is prevented, thus protecting external power equipment from damage. Such a lightning protector is called an explosion-proof lightning protector.

The problem of the explosion-proof lightning protector is that the insulation cylinder is subjected to expansion and contraction due to the temperature difference during assembly or operation. More particularly, the insulation cylinder, when expanded, extends and lifts the cover plates, thereby deteriorating the sealing function of the insulator, while, at the same time, generating an excessive stress on the insulation cylinder, often damaging it.

Also, since heat is constantly generated from the zinc oxide elements during operation, an increase in the element temperature by absorption of a surge current will cause the insulation cylinder to block heat discharge from the elements, thus suddenly increasing the leakage current in what is called the thermal runaway state.

The object of the present invention is to provide a zinc oxide lightning protector overcoming the disadvantages resulting from an expansion of the insulation cylinder.

According to the present invention, a zinc oxide lightning protector is provided which includes cover plates at respective ends of an insulator, a zinc oxide element section disposed between the cover plates, and support members provided on the cover plates between the zinc oxide element section and the insulator. The insulation cylinder is supported between the support members and a gap is formed between at least an end of the insulation cylinder and a corresponding cover plate to prevent deformation of the insulation cylinder by absorbing the expansion of the insulation cylinder due to the temperature change through the gap. The zinc oxide element section is arranged eccentrically to generate a turbulent flow thereby improving the heat conduction and hence radiation characteristic from the zinc oxide element section.

The present invention will be apparent from the following detailed description taken in conjunction with the accompanying drawings, in which.

Figure 1:
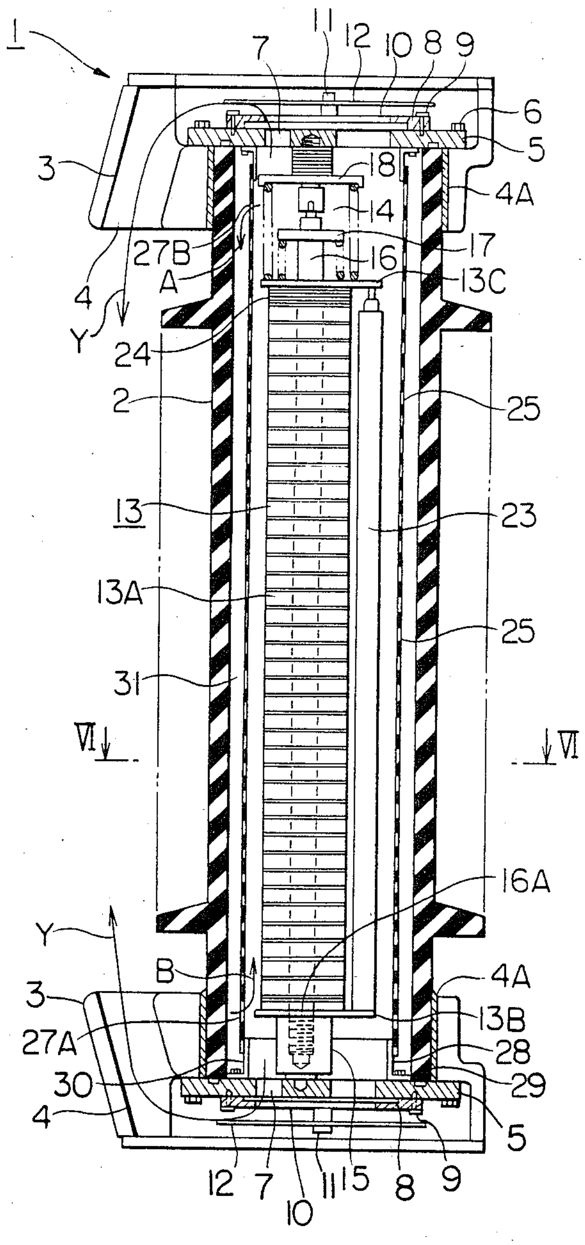
FIG. 1 is a side sectional view of a zinc oxide lightning protector according to an embodiment of the present invention.

Referring now to the drawings wherein like reference numerals are used throughout the various views to designate like parts and, more particularly, to FIG. 1, according to this figure, a zinc oxide lightning protector generally designated by the reference numeral 1 includes end peripheral parts of an insulator 2 integrally bonded with a metal end cover 3 by a bonding agent layer 4A, with the upper and lower metal end covers 3 forming gas outlet ports 4 on sides thereof corresponding to each other. (Arc gases designated by the arrow Y from the gas outlet ports 4 are offset with respect to each other. Cover plates 5 are arranged on the ends of the metal end covers 3 and the insulator 2, and the cover plates 5 and the metal end covers 3 are fastened to each other by a fastening means, such as, for example, a bolt 6 to hermetically seal an interior of the insulator 2.

The cover plates 5 include a pressure release hole 7 for enabling a communication between the insulator 2 and the respective metal end covers 3. A pressure-averting plate 8 is mounted on the outside of the respective cover plates 5 by a fastening means such as, for example, a bolt 9. A pressure-averting film 10 is interposed in a manner to block the pressure release hole 7 between the respective cover plates 5 and the respective pressure-averting plate 8. A support member 11 is supported on the respective pressure-averting plate 8 to extend toward the metal end cover plate and carries a protective cover 12 at the end thereof. A zinc oxide element section 13 is arranged between the upper and lower cover plates 5. A pressure adjusting section 14 and a seat 15 are arranged between the cover plates 5 and the ends of the zinc oxide element section 13.

Figure 2:
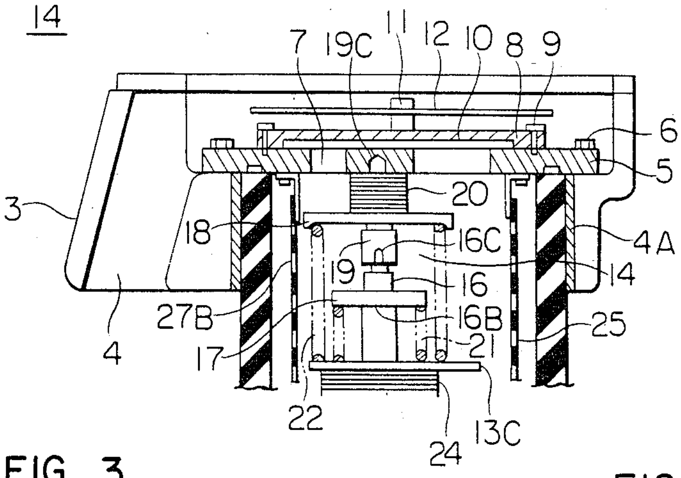
FIG. 2 is an enlarged side sectional view of the part of the apparatus around the pressure adjusting section in FIG. 1.

The zinc oxide element section 13 includes an insulation rod 16 onto which a plurality of zinc oxide elements 13A are mounted, and supports 13B, 13C at the respective ends thereof. The lower end 16A of the insulation rod 16 is inserted into a hole of the seat 15, and the support 13B contacts the seat 15. The upper end of the insulation rod 16, as shown in FIG. 2, is formed with a step 16B and an end portion 16C, which make up a part of the pressure adjusting section 14. The pressure adjusting section 14 includes a first pressure plate 17 and a second pressure plate 18 arranged in predetermined spaced relationship with respect to each other. The first pressure plate 17 is mounted onto the insulation rod 16 and received by the step 16B, with the forward end portion 16C inserted into the intermediate seat 19. The second pressure plate 18 is fitted into the intermediate seat 19, and received by the step of the intermediate seat 19. The forward end 19C of the intermediate seat 19 is inserted into the hole formed in the cover plate 5. A plurality of washers 20 are arranged on the intermediate seat 19 between the cover plate 5 and the second pressure plate 18. A first spring 21 and a second spring 22 are interposed between the first pressure plate 17 or the second pressure plate 18 and the support plate 13C, with the springs 21, 22 exerting pressure on the zinc oxide element section 13 and a voltage-dividing capacitor 23 arranged between the support plates 13B and 13C. An adjusting liner 24, arranged between the support plate 13C and the zinc oxide element section 13, adjusts a height of the zinc oxide element section 13 and the pressure applied by the first and second springs 21, 22. An insulation cylinder 25 is arranged between the zinc oxide element section 13 and the insulator 2. The zinc oxide element section 13 is arranged eccentrically against the insulation cylinder 25.

Figure 3:
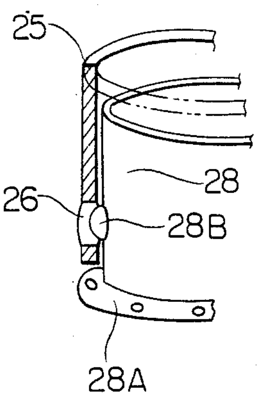
FIG. 3 is a perspective view of a guide cylinder in FIG. 1.
Figure 4:
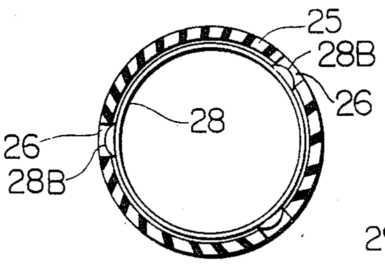
FIGS. 4 and 5 are a sectional view and a side sectional view of the guide cylinder in FIG. 1 respectively.
Figure 5:
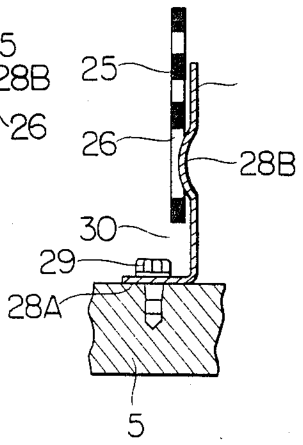

The insulation cylinder 25 is made of a heat resistant material and a material having a high mechanical strength such as, for example, Teflon or FRP (fiber-reinforced plastic), and has, as shown most clearly in FIGS. 3–5, the ends thereof formed with holes 26 formed along the peripheral direction of the insulation cylinder 25. An inlet port 27A and an exhaust port 27B (See FIG. 1) are formed at the ends of the insulation cylinder 25, with the insulation cylinder 25 being supported by a support metal member 28.

An end of the cylindrical support metal member 28 is formed with a flange 28A, bent toward the insulator 2, and a protrusion 28B. The flange 28A is mounted with a fastening means such as, for example, a screw 29, to the cover plate 5. The protrusion 28B is fitted into the hole 26 to support the insulation cylinder 25 on the support metal member 28.

The space 30, formed between the ends of the insulation cylinder 25 and the cover plate 5 or the flange 28A, may alternatively be formed only at an end of the insulation cylinder 25.

In this configuration, the ends of the insulation cylinder 25 are left free through the space 30. As a result, the temperature in the insulation cylinder 25 is different during assembly and during operation. The temperature generated in the insulation cylinder 25 during operation which is caused, for example, by the zinc oxide element section 13, is higher than the temperature caused in the same insulation cylinder 25 during assembly. The result is a larger elongation of the insulation cylinder during operation than during assembly. Since the elongation is absorbed into the space 30, however, the insulation cylinder 25 is prevented from colliding with the cover plate 5. Thus, the insulator 2 can be maintained in hermetic state, preventing damage to the insulation cylinder 25.

Figure 6:
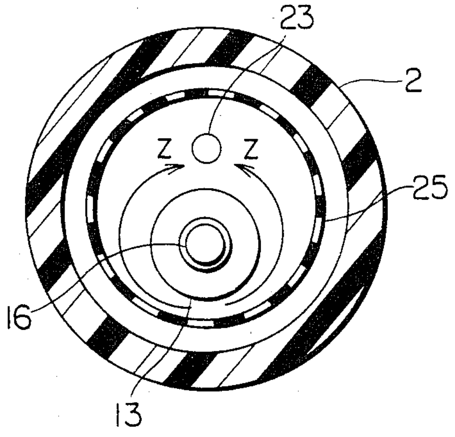
FIG. 6 is a sectional view taken along line VI—VI in FIG. 1.

On the other hand, the air warmed in the insulation cylinder rises, and as shown by arrow A, is exhausted into the space formed between the insulation cylinder 25 and the insulator 2 by way of the exhaust port 27B. The warmed air falls by being cooled by the insulator 2, and as shown by arrow B, flows into the insulation cylinder 25 by way of inlet port 27A to thereby cool the zinc oxide element section 13. In the process, as shown in FIG. 6, the gas flows in the direction of arrow Z, due to the fact that the zinc oxide element section 13 is eccentrically arranged against the insulation cylinder 25 so that part of the space of the zinc oxide element section 13, nearer to the insulation cylinder 25, is heated more than the opposite part thereof. This flow disturbs the laminar flow along the axis of the zinc oxide element as shown by arrow B, and the resulting turbulent flow improves the heat conduction.

In this way, the inlet port 27A and the exhaust port 27B in the insulation cylinder 25 and the eccentric arrangement of the zinc oxide element section 13 permit the insulation cylinder 25 and the zinc oxide element section 13 to be cooled with a simple construction by means of natural convection.

It will be understood from the foregoing descriptions that according to the present invention, the deformation of the insulation cylinder 25 can be prevented, and the zinc oxide element section 13 can be effectively cooled.

We claim:

1. A zinc oxide lightning protector comprising an insulation cylinder arranged in an insulator having cover plates mounted at both ends of the insulator, and a zinc oxide element section arranged in said insulator cylinder, said zinc element oxide section being cooled by gas flowing from an inlet port to an exhaust port formed at the insulation cylinder said zinc oxide element section is arranged eccentrically on one side of said insulation cylinder.

2. A zinc oxide lightning protector comprising an insulator, cover plates mounted at the ends of the insulator, a zinc oxide element section arranged between the cover plates, and an insulation cylinder arranged between the zinc oxide element section and the insulator, the insulation cylinder is supported between support metal members provided on the cover plates between the zinc oxide element section and the insulator, a space is formed between at least an end of the insulation cylinder and at least a selected one of the cover plate corresponding to said end of the insulation cylinder and the flange of the support member, and wherein the zinc oxide element is arranged eccentrically on one side of the insulation cylinder.

3. A zinc oxide lightning protector comprising an insulator, cover plates mounted at the ends of the insulator, a zinc oxide element section arranged between the cover plates, and an insulation cylinder arranged between the zinc oxide element section and the insulator, wherein the insulation cylinder is supported between support metal members provided on the cover plates between the zinc oxide element section and the insulator, a space is formed between at least an end of the insulation cylinder and at least one of the cover plate corresponding to said end of the insulation cylinder and the flange of the support member, and wherein a protrusion toward the outside is formed on a part of said support metal member, said protrusion being inserted into a hole formed in said insulation cylinder.

4. A zinc oxide lightning protector comprising an insulator, cover plates mounted at the ends of the insulator, a zinc oxide element section arranged between the cover plates, and an insulation cylinder arranged between the zinc oxide element section and the insulator, wherein the insulation cylinder is supported between support metal members provided on the cover plates between the zinc oxide element section and the insulator, and a space is formed between at least an end of the insulation cylinder and at least one of the cover plate corresponding to said end of the insulation cylinder and the flange of the support member, the zinc oxide element is arranged eccentrically on one side of the insulation cylinder, and wherein a protrusion toward the outside is formed on part of said support metal member, said protrusion being inserted into a hole formed in said insulation cylinder.

5. A zinc oxide lightning protector comprising an insulator, cover plates mounted at the ends of the insulator, a zinc oxide element section arranged between the cover plates, and an insulation cylinder arranged between the zinc oxide element section and the insulator, wherein the insulation cylinder is supported between support metal members provided on the cover plates between the zinc oxide element section and the insulator, and a space is formed between at least an end of the insulation cylinder and at least one of the cover plate corresponding to said end of the insulation cylinder and the flange of the support member, the zinc oxide element section is arranged eccentrically on one side of the insulation cylinder, and wherein holes are formed at the ends of said insulation cylinder to cause natural convection.

* * * * *